US011213793B2

(12) United States Patent
Smith et al.

(10) Patent No.: US 11,213,793 B2
(45) Date of Patent: Jan. 4, 2022

(54) CAVITATION PUMP (71) Applicant: Highland Fluid Technology, Inc., Houston, TX (US)

(72) Inventors: Kevin W. Smith, Bellaire, TX (US); Jeff Fair, Houston, TX (US)

(73) Assignee: Highland Fluid Technology, Inc., Houston, TX (US)

( * ) Notice: Subject to any disclaimer, the term of this patent is extended or adjusted under 35 U.S.C. 154(b) by 84 days.

(21) Appl. No.: 16/280,416

(22) Filed: Feb. 20, 2019

(65) Prior Publication Data

US 2019/0176108 A1 Jun. 13, 2019

Related U.S. Application Data

(62) Division of application No. 14/715,160, filed on May 18, 2015, now Pat. No. 10,258,944.

(60) Provisional application No. 62/000,116, filed on May 19, 2014.

(51) Int. Cl.
*B01F 7/00* (2006.01)
*B01F 7/26* (2006.01)
*B01F 7/10* (2006.01)

(52) U.S. Cl.
CPC ...... *B01F 7/00816* (2013.01); *B01F 7/00491* (2013.01); *B01F 7/00641* (2013.01); *B01F 7/10* (2013.01); *B01F 7/26* (2013.01); *B01F 2215/0081* (2013.01); *B01J 2219/00761* (2013.01)

(58) Field of Classification Search
CPC ............... B01F 2215/0081; B01F 7/00816
See application file for complete search history.

(56) References Cited

U.S. PATENT DOCUMENTS

| 1,061,142 A | 5/1913 | Tesla |
| 3,198,191 A | 8/1965 | Wyszomirski |
| 3,533,480 A | 10/1970 | Chenevert et al. |

(Continued)

FOREIGN PATENT DOCUMENTS

KR 101237143 B1 * 2/2013

OTHER PUBLICATIONS

Espacenet Translations of Ji, Hyo Keun (KR 101237143 B1), published Feb. 25, 2013. Translations retrieved Mar. 17, 2019. (Year: 2013).*

(Continued)

*Primary Examiner* — Elizabeth Insler
(74) *Attorney, Agent, or Firm* — Vorys, Safer, Seymour and Pease LLP; William L. Krayer (57) ABSTRACT

A cavitation device is supplied by a disc pump with fluids for mixing. A cavitation rotor, having an array of cavities on its cylindrical surface, is fixed to a shaft for rotation by a motor. The disc pump and the cavitation device are beneficially in the same housing. At least one disc is spaced from and attached to the rotor near the inlet end of the cylindrical housing, so it will rotate with the rotor. A central hole in the (at least one) disc permits fluid to enter the space between the disc and the rotor; it is flung toward the peripheral space between the rotor and the cylindrical housing, where it is subjected to cavitation, and then passed to an outlet. The shaft may pass through one or both of the end walls of the cylindrical housing. The cavitation pump is especially useful for mixing oil field fluids.

8 Claims, 6 Drawing Sheets

(56) References Cited

U.S. PATENT DOCUMENTS

| | | |
|---|---|---|
| 4,231,867 A | 11/1980 | Sutphin |
| 4,437,940 A | 3/1984 | Sussmeyer et al. |
| 4,481,109 A | 11/1984 | Stewart |
| 4,490,049 A | 12/1984 | Sanders et al. |
| 4,514,139 A | 4/1985 | Gurth |
| 4,533,366 A | 8/1985 | Bland |
| 4,773,819 A | 9/1988 | Gurth |
| 4,940,385 A | 7/1990 | Gurth |
| 5,188,090 A | 2/1993 | Griggs |
| 5,211,856 A | 5/1993 | Shen |
| 5,239,948 A | 8/1993 | Sajewski |
| 5,240,617 A | 8/1993 | Hopf |
| 5,385,298 A | 1/1995 | Griggs |
| 5,419,306 A | 5/1995 | Huffman |
| 5,445,731 A | 8/1995 | Tuohey et al. |
| 5,931,153 A | 8/1999 | Geibeler et al. |
| 5,957,122 A | 9/1999 | Griggs |
| 6,016,798 A | 1/2000 | Selivanov |
| 6,164,274 A | 12/2000 | Geibler et al. |
| 6,214,219 B1 | 4/2001 | Fisher |
| 6,315,532 B1 | 11/2001 | Appleby |
| 6,533,929 B2 | 3/2003 | Binsfeld et al. |
| 6,566,410 B1 | 5/2003 | Zaki et al. |
| 6,595,759 B2 | 7/2003 | Crosta et al. |
| 6,596,178 B1 | 7/2003 | Archibald et al. |
| 6,627,784 B2 | 9/2003 | Hudson et al. |
| 6,849,175 B2 | 2/2005 | Kresnyak |
| 6,857,774 B2 * | 2/2005 | Kozyuk ............... B01F 3/0807 366/263 |
| 6,910,448 B2 | 6/2005 | Thoma |
| 6,959,669 B2 | 11/2005 | Thoma |
| 6,976,486 B2 | 12/2005 | Thoma |
| 7,089,886 B2 | 8/2006 | Thoma |
| 7,201,225 B2 | 4/2007 | Smith et al. |
| 7,360,755 B2 | 4/2008 | Hudson et al. |
| 7,553,124 B1 | 6/2009 | Jimenez |
| 7,705,058 B2 | 4/2010 | Coutinho et al. |
| 7,736,518 B2 | 6/2010 | Smith et al. |
| 8,042,989 B2 | 10/2011 | Gordon et al. |
| 8,430,968 B2 | 4/2013 | Mancosky et al. |
| 8,597,524 B2 | 12/2013 | Donnelly |
| 2012/0014779 A1 | 1/2012 | Gilliam |
| 2012/0291765 A1 | 11/2012 | Griggs |

OTHER PUBLICATIONS

Translation of Ji, Hyo Keun (KR 101237143), published Feb. 25, 2013. Translation retrieved Oct. 2019. (Year: 2013).*

* cited by examiner

CAVITATION PUMP

CROSS REFERENCE TO RELATED APPLICATION

This application is a divisional application of and claims the benefit of U.S. patent application Ser. No. 14/715,160, filed May 18, 2015, which claims the benefit of U.S. Provisional Patent Application No. 62/000,116, filed May 19, 2014, both being incorporated by reference in their entirety herein.

TECHNICAL FIELD

A disc pump and a cavitation mixing/heating device are combined in a single unit.

BACKGROUND OF THE INVENTION

The phenomenon of cavitation, as it sometimes happens in pumps, is generally undesirable, as it can cause choking of the pump and sometimes considerable damage not only to the pump but also auxiliary equipment.

However, cavitation, more narrowly defined, has been put to use as a source of energy that can be imparted to liquids. Certain devices employ cavities deliberately machined into a rotor turning within a cylindrical housing leaving space for liquid to pass. A motor or other source of turning power is required as well as an external pump to force the fluid through. The phenomenon of cavitation in all previous devices relevant hereto is caused by the rapid passage of the liquid over the cavities, which creates a vacuum in them, tending to vaporize the liquid; the vacuum is immediately filled again by the liquid and created again by the movement of the liquid, causing extreme turbulence in the cavities, further causing heat energy to be imparted into the liquid. Liquids can be simultaneously heated and mixed efficiently with such a device. Also, although the cavitation technique is locally violent, the process is low-impact compared to centrifugal pumps and mixing pumps employing impellers, and therefore is far less likely to cause damage to sensitive polymers used in oilfield fluids. Centrifugal pumps tend also to break large particles such as drill cuttings into small, low gravity particles which are more difficult to separate by centrifugation. The impeller blades of many types of pumps will fracture and break solids into smaller particles which may resist separation by any conventional method.

Good mixing is especially important in mixing oil field fluids such as drilling fluids and fracturing fluids.

Proper operation of the cavitation device, until now, has generally required a separate pump. Liquid must be forced through the existing cavitation devices to accomplish substantial heating, mixing, or both. Cavitation devices are excellent for intimately mixing gases with liquids, but centrifugal pumps do not handle large volumes of gases well, sometimes losing the ability to pump at all when the gas volume s too great. A disc pump can easily handle and pump mixtures containing significant volumes of gas.

Moreover, in the conventional cavitation devices, there is a viscous or surface effect drag against the stationary end wall of the cavitation device housing. There is a need for improvements to overcome these disadvantages of the existing cavitation devices.

SUMMARY OF THE INVENTION

By the incorporation of at least one rotating disc having an open center for the passage of liquid, and with an appropriate housing design for intake and outflow, I am able to use the same motor that turns the cavitation device rotor to turn the disc also, thus utilizing the disc in combination with the cavitation rotor as a kind of disc pump to pass the liquid through the cavitation device. The rotating disc not only facilitates a pumping effect, but ameliorates the counterproductive drag imposed by the stationary housing wall of the unit.

My combined disc pump and cavitation device is inherently safer than the conventional use of a positive displacement pump to force the mixture through a separate cavitation device, in that, if there is a blockage of some sort, excess pressure will not build up within the device. Although the disc, or discs, will continue turning, they will generate only a relatively low pressure within the device.

The shaft may pass through both end walls or only one end wall. The inlet and outlet may be independently on the respective end wall or on the cylindrical shell, providing a flow path for the fluid across the cavitation device—that is, forming an inlet end and an outlet end of the device for the flow path.

The combined device may be immersed in a mixing tank so that its intake is below the level of the materials to be mixed; the motor may be above the liquid level or its shaft may pass through the wall of the tank.

DETAILED DESCRIPTION OF THE INVENTION

Figure 1:
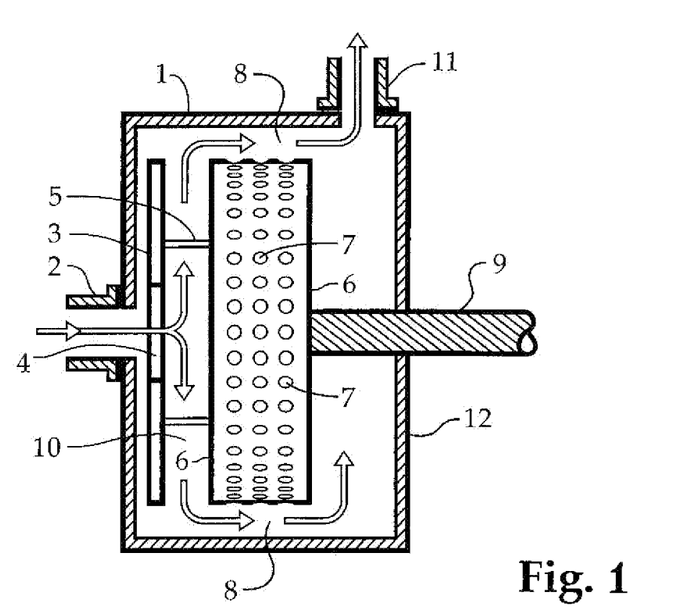
FIG. 1 is a side sectional view of the cavitation pump.

Referring first to FIG. 1, the cavitation pump is shown in section and more or less diagrammatically. Fluid enters a housing 1 through a conduit 2 passing through central hole 4 in solid disc 3. Solid disc 3 is held in place by disc supports 5, which are attached to cavitation rotor 6. Cavitation rotor 6 is substantially cylindrical in shape and has a plurality of cavities 7 on its cylindrical surface. Housing 1 is also substantially cylindrical in shape so that its inside surface can accommodate the cylindrical surface of the cavitation rotor 6 substantially concentrically and in close proximity. That is, the peripheral space 8 between the cavitation rotor 6 and the substantially concentric internal surface of the housing 1 is somewhat constricted to enhance the efficiency of the cavitation effects on the fluid, as will be explained more fully below. Cavitation rotor 6 is mounted on a shaft 9 which passes through the end wall 12 of housing 1 by way of a thrust bearing having a seal, not illustrated. The end wall 12 of housing 1 is substantial enough to accommodate the thrust bearing, which permits rotation of the shaft 9 and its attached cavitation rotor 6 and solid disc 3, and a suitable seal to prevent leakage. Suitable fixtures for the conduit 2 may also be envisioned. As indicated by the arrows, fluid flows into the housing 1 through conduit 2, then through the central hole 4 of solid disc 3; it then fans out 360 degrees in the distribution space 10 between solid disc 3 and cavitation rotor 6, finally exiting peripherally through fluid outlet 11. By peripherally, I mean on the rounded, or cylindrical, surface of housing 1 as opposed to the normally substantially planar end wall 12. It may also be noted that the cylindrical housing has an inlet end near solid disc 3 and an outlet end on the opposite side of rotor 6. In a variation, the outlet may be located on end wall 12.

The cavitation rotor 6, acting within a surface-conforming housing 1, acts in a known manner to simultaneously heat and intimately mix fluids. But unlike previously known devices, fluid entering through conduit 2 of the present invention need not be pumped or otherwise under positive pressure. Introduction of solid disc 3 provides a disc pump action integral to the cavitation device. Various aqueous and nonaqueous liquids may be mixed in my invention; solid materials may be dissolved or hydrated, and gases, including air, may be introduced to the mix, most conveniently by injecting them into conduit 2.

Cavitation devices are designed deliberately to generate heat by cavitation. Cavitation occurs in a fluid when the fluid flows in an environment conducive to the formation of partial-vacuum spaces or bubbles within the fluid. Since the spaces or bubbles are partial vacuum, they almost immediately implode, causing the mechanical or kinetic energy of the fluid to be converted into thermal energy. In many devices, such as most pumps, cavitation is an occurrence to be avoided for many reasons, not least because of convulsions and disruption to the normal flow in the pump, but also because of the loss of energy when the mechanical energy of the pump is converted to undesired heat instead of being used to propel the fluid on a desired path. There are, however, certain devices designed deliberately to achieve cavitation in order to increase the temperature of the fluid treated. Such cavitation devices are manufactured and sold by Hydro Dynamics, Inc., of Rome, Ga., perhaps most relevantly the devices described in U.S. Pat. Nos. 5,385,298, 5,957,122, 6,627,784 and particularly 5,188,090, all of which are hereby specifically incorporated herein by reference in their entireties. These patents may be referred to below as the HDI patents.

The basic design of the cavitation devices described in the HDI patents comprises a cylindrical rotor having a plurality of cavities bored or otherwise placed on its cylindrical surface. The rotor turns within a closely proximate cylindrical housing, permitting a specified, relatively small, space or gap between the rotor and the housing. Fluid enters at the face or end of the rotor, flows toward the outer surface, and enters the space between the concentric cylindrical surfaces of the rotor and the housing. While the rotor is turning, the fluid continues to flow within its confined space toward the exit at the other side of the rotor, but it encounters the cavities as it goes. Flowing fluid tends to fill the cavities, but is immediately expelled from them by the centrifugal force of the spinning rotor. This creates a small volume of very low pressure within the cavities, again drawing the fluid into them, to implode or cavitate. This controlled, semi-violent action of micro cavitation brings about a desired conversion of kinetic and mechanical energy to thermal energy, elevating the temperature of the fluid without the use of a conventional heat transfer surface.

Benefits of the HDI-style cavitation devices include that they can handle slurries as well as many different types of mixtures and solutions, and the heating of the fluid occurs within the fluid itself rather than on a heat exchange surface which might be vulnerable to scale formation and ultimately to a significant loss of energy and reduction in heat transfer.

However, the conventional cavitation devices require the use of an external pump. My invention incorporates a disc pump into the housing used by the cavitation rotor, and utilizes one side of the cavitation rotor as part of the disc pump. None of the versatility of the conventional cavitation devices in handling solutions, mixtures and slurries is sacrificed by combining the disc pump action with cavitation in the same housing.

Figure 2:
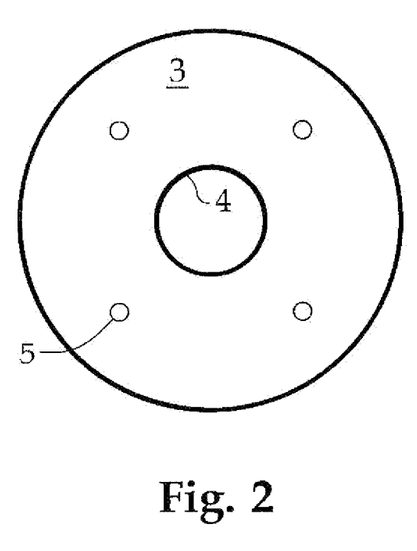
FIG. 2 is a front view of a pump disc.

Referring now to FIG. 2, the solid disc 3 is seen from the front. It has a hole 4 in its center to permit fluid to pass through, and has a plurality of disc supports 5 (see FIG. 1 also) to retain it in place in a plane substantially parallel to that of the cavitation rotor 6; thus it rotates with the cavitation rotor 6.

Figure 3:
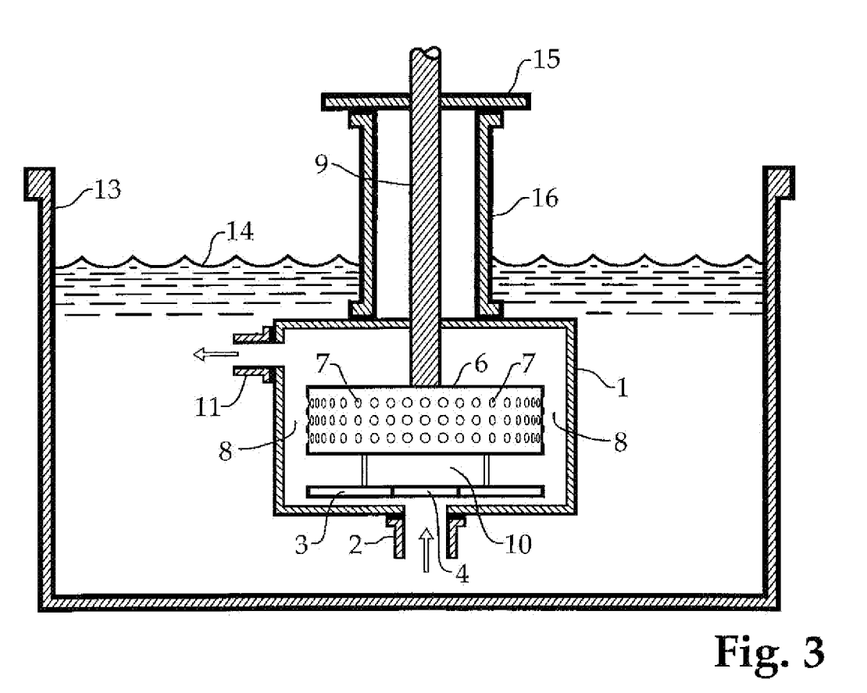
FIG. 3 is side sectional view of the cavitation pump employed as a tank mixer.

In FIG. 3, the cavitation pump of FIG. 1 is set up to mix materials in tank 13. Housing 1 is fully submerged in tank 13, in fluid having a fluid level 14. A motor not shown is mounted on motor base 15 and stabilized by housing supports 16. Motor shaft 9 passes below fluid level 14 and through housing 1 as explained in FIG. 1, and rotates cavitation rotor 6, which has cavities 7. Fluid already in the tank enters through conduit 2 through central hole 4 of disc 3 and passes into distribution space 10, through peripheral space 8, and out fluid outlet 11 as described with respect to FIG. 1. Fluid outlet 11 may have an extension or otherwise connect to the open space above fluid level 14 to reduce back pressure. As indicated in the discussion above, the cavitation rotor 6 acting on the liquid within the confined peripheral space 8 will heat the fluid, which will facilitate and render more efficient the mixing of whatever materials are in the fluid. Various aqueous and nonaqueous fluids may be mixed, and many different types of solids may be readily dissolved or dispersed with the cavitation pump, which does not require any pumping or positive force to cause the fluid to enter. Materials to be mixed are added to the tank in any convenient manner.

Figure 4:
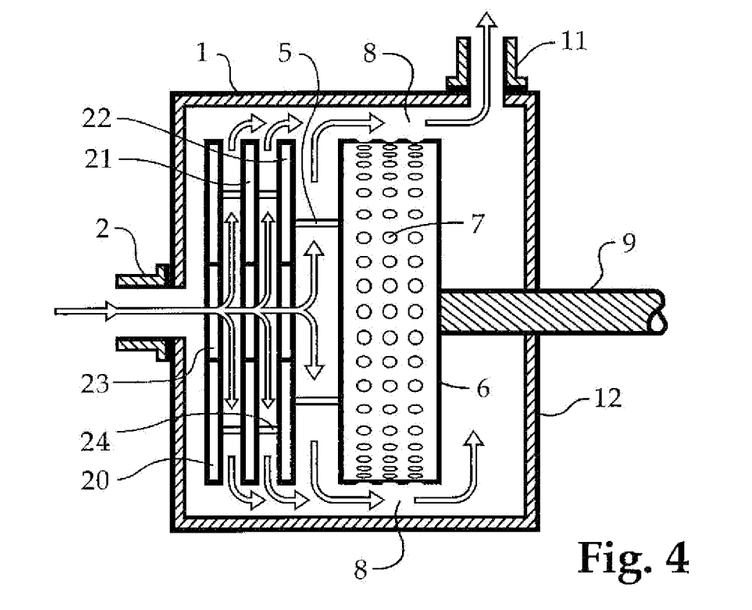
FIG. 4 shows a variation of the invention having more than one disc.

FIG. 4 is a sectional view similar to FIG. 1 except that it incorporates three discs 20, 21, and 22. Discs 20, 21, and 22 may be thinner or thicker than disc 3 of FIG. 1, but each has a central hole similar to central hole 4 of disc 3—central hole 23, for example, is in disc 20. The cavitation pump of FIG. 4 has a cavitation rotor 6 for rotating with shaft 9 in cylindrical housing 1 as in FIG. 1. Disc supports 5 connect cavitation rotor 6 to disc 22, disc supports 24 connect disc 22 to disc 21, and disc 21 to disc 20, maintaining all the discs in planes substantially parallel to cavitation rotor 6. Cavitation rotor 6 has cavities 7 also as in FIG. 1.

Fluid enters through a conduit 2 as in FIG. 1, and passes through central hole 23 of disc 20. As shown by the arrows, some of the fluid is distributed between discs 20 and 21, some continues through the central hole of disc 21 (similar to central hole 23 of disc 20), where some is distributed between disc 21 and disc 22; some fluid continues through the hole in disc 22 and is distributed between disc 22 and cavitation rotor 6. A motor not shown turns shaft 9, turning the rotor 6 and all three discs, causing the centrifugal distribution of the fluid as indicated by the arrows, acting as a pump to continue the flow of fluid. In the peripheral space 8, the fluid continuously flows into cavities 7 and is flung out by centrifugal force, thereby creating the alternating vacuum and micro-implosions that effectively mix and heat the fluid before it exits at fluid outlet 11.

A multidisc variant of my invention such as is illustrated in FIG. 4 can be used in the tank mixing configuration of FIG. 3.

My cavitation pump can employ several discs aligned in a manner similar to that shown in FIG. 4; as a practical matter, the strength of the seal and bearing for the shaft 9 in end wall 12 may be a limiting factor; otherwise there is no reason not to have as many as twelve or more discs.

Figure 5:
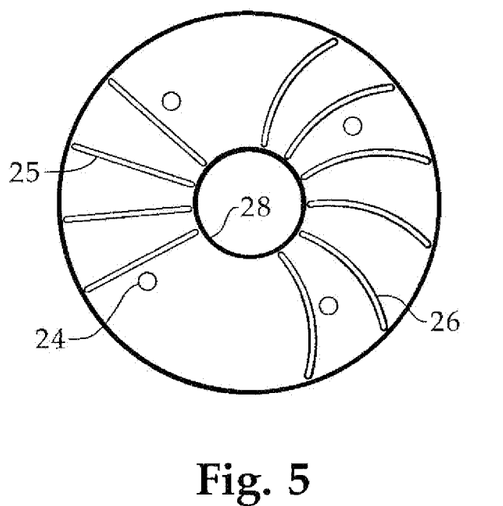
FIG. 5 illustrates a disc having splines.

FIG. 5 shows the face of a disc similar to discs 20, 21, and 22 in FIG. 4 except that it has splines, illustrated as straight radial splines 25 and curved splines 26. As with the other illustrated discs, the disc of FIG. 5 has a central hole 28 and disc supports 24 which may be similar to disc supports 5. Splines are ridge-like protuberances designed to encourage the flow of the fluid from the center of the disc to its periphery; hence they are generally radial. Splines 25 are substantially straight and splines 26 have a curve which may be designed to take into account the speed of rotation of the disc. Although the illustration of FIG. 5 shows both kinds on the same disc, the user may wish to have one or the other, or no splines at all. The splines need not extend the entire distance from the edge of hole 28 to the rim of the disc, as illustrated. Splines may be included on one or both sides of the discs, and may be built into one or both sides of rotor 6.

Figure 6:
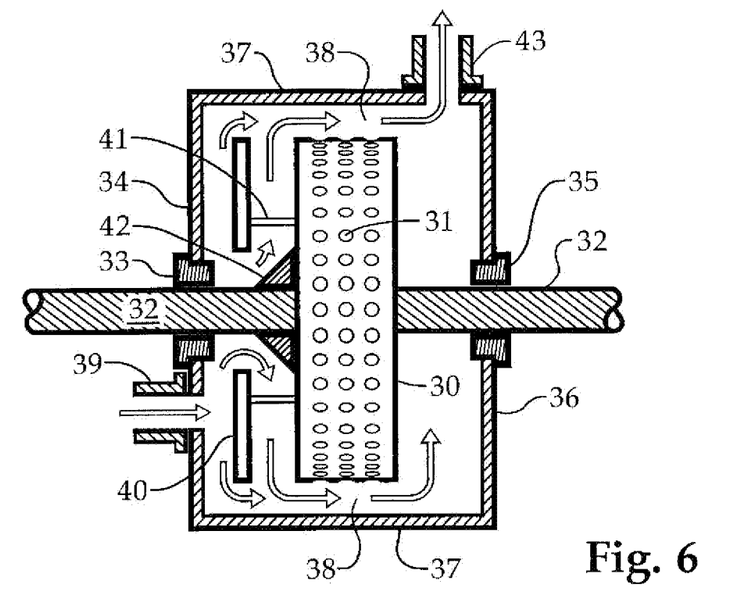
FIG. 6 shows a variation in which the shaft passes through both ends of the cylindrical housing.

Referring now to FIG. 6, cylindrical rotor 30 having cavities 31 is mounted on shaft 32 substantially as previously described. Shaft 32 is connected to a motor or other power source not shown. Shaft 32 passes through seal 33 in end wall 34 of the housing as well as seal 35 of end wall 36 of the housing. Cylindrical shell 37 is substantially concentric to the periphery of rotor 30, forming a cavitation zone 38, similar to peripheral space 8 in FIG. 1, around rotor 30. Fluid entering inlet 39 encounters disc 40, which is held in place by supports 41 connected to rotor 30. Disc 40 has a central hole 44 (see FIG. 7) similar to central hole 4 in FIG. 1. Unlike FIG. 1, fluid entering through inlet 39 does not pass directly into the hole 44 but impacts disc 40 as may be seen also in FIG. 7. Helping to direct the flow as indicated by the arrows is an optional accelerator 42, having a slanted or conical surface around shaft 32. The surface of accelerator 32 may have a curved profile as well as the straight profile shown. After passing through the cavitation zone 38 as indicated by the arrows, the fluid, now well mixed, exits through outlet 43. Outlet 43 need not be on cylindrical shell 37 as shown, but could alternatively be located in end wall 36. The outlet is positioned so that the fluid must traverse the full width of rotor 30 before reaching it. As seen in FIG. 6, inlet 39 and outlet 43 define a flow path half way around the internal surface of shell 37 as well as through cavitation zone 38. The invention is not limited to the placement of the inlet and outlet 180 degrees apart with respect to shell 37. They may be placed at any angular distance from each other with respect to the cylindrical shell 37.

The FIG. 6 variation of the invention is not limited to the use of only one disc. It may have two, three (as seen in FIG. 4) or more. Since shaft 32 passes through both end walls 34 and 36, the variation of FIG. 6 is quite rugged. But it should be noted also that a significant advantage of all variations of my invention is that it can handle high viscosity fluids more efficiently than a centrifugal pump.

Figure 7:
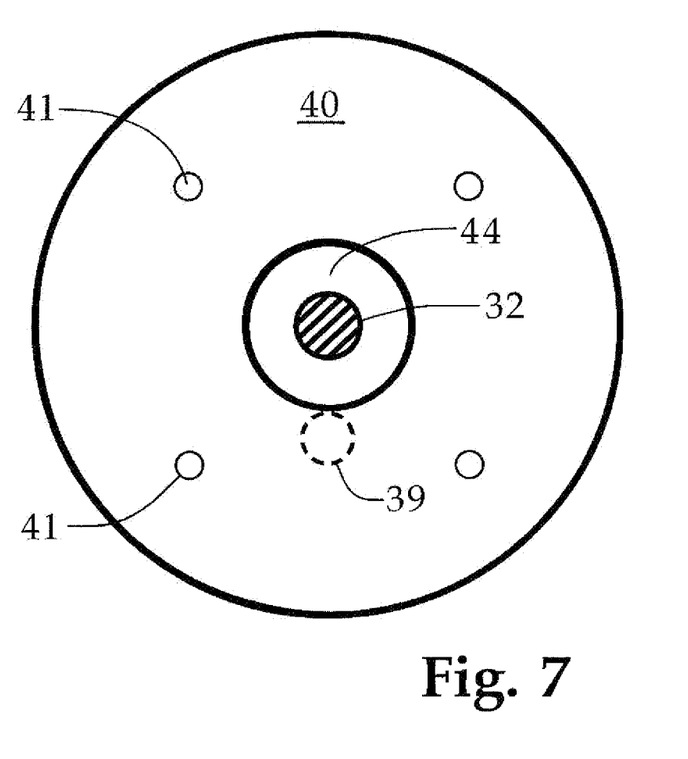
FIG. 7 is the face of the disc in FIG. 6.

FIG. 7 shows the face of disc 40, to illustrate that it encircles shaft 32 while inlet 39 is not centrally located as inlet 2 is in FIG. 1. Fluid entering inlet 39 will tend to impact disc 40 and will flow both toward the cylindrical shell 38 (see FIG. 6) and through hole 44, in both cases having to pass through cavitation zone 38 before arriving at outlet 43. Disc 40 may have splines as described with respect to FIG. 5.

The variation of FIGS. 6 and 7 can be immersed in a tank in a manner similar to that shown in FIG. 3.

Since my device does not require an external high pressure pump, high pressure seals are not needed. They may be desired, however, to protect against the possibility of a high pressure backup event or some other unforeseen circumstance.

The invention includes a technique for starting up wherein the device is partially filled with fluid before the rotation is begun—that is, before the motor is started. The reduced torque requirements of a partially filled device will enable a smooth startup.

My cavitation pump can be used to prepare drilling muds, completion fluids, and fracturing fluids for use in hydrocarbon recovery, and to hydrate synthetic and natural polymers for use in oilfield fluids. Excellent mixing can be accomplished without a tank as shown in FIG. 3—that is, various materials including at least one fluid can be present in inlet conduit 2 as shown in FIG. 1, and they will be thoroughly mixed by activating the motor to turn shaft 9.

Thus, my invention compnses a cavitation pump comprisng (a) a substantially cylindrical cavitation rotor having a plurality of cavities on its periphery, (b) a housing defining an enclosed chamber having a fluid inlet on an inlet end and a fluid outlet on an outlet end, the housing having a substantially cylindrical internal surface including an end wall adapted to receive a shaft bearing, the diameter of said substantially cylindrical internal surface being slightly larger than the cavitation rotor (c) the cavitation rotor being fixed to a rotation shaft so as to fit closely within the substantially cylindrical internal surface, the rotation shaft passing through a shaft bearing mounted in the end wall of the housing, and (d) at least one disc spaced from and disposed substantially parallel to the cavitation rotor, the at least one disc being fixed to the cavitation rotor so as to rotate with the cavitation rotor.

My invention also includes a method of mixing fluids comprising pumping said fluids with a disc pump through a cavitation device. The disc pump and cavitation device may be in separate housings.

In addition, my invention includes a cavitation pump comprising (a) a housing including two end walls and a shell defining a cylindrical internal surface, (b) a cylindrical rotor having a plurality of cavities on its surface, (c) a shaft for turning the rotor, the shaft passing through at least one end wall and being connected to a rotational power source, (d) at least one disc spaced from the rotor, the disc having a central hole and being held in a plane parallel to the rotor by supports from the rotor, (e) a fluid inlet on or near one of the end walls, and (f) a fluid outlet on or near the other of the end walls.

The invention claimed is:
1. Method of mixing and heating a fluid comprising:
    (1) pumping said fluid with a disc pump through a cavitation device, said disc pump comprising at least one disc mounted on a shaft for rotating said at least one disc, said cavitation device comprising:
        (a) a substantially cylindrical rotor including a cylindrical surface and having a plurality of dead-end cavities on said cylindrical surface, said rotor being mounted on said shaft for rotating said at least one disc said rotor forming a distribution space between said rotor and said at least one disc,
        (b) a housing for said disc pump and said cylindrical rotor, said housing having an internal cylindrical surface substantially concentric with and slightly larger than said cylindrical rotor surface, said substantially concentric internal surface and said cylindrical rotor surface together forming a cavitation zone,

(c) a fluid inlet for directing said fluid to said at least one disc of said disc pump, and, (d) a fluid outlet for removing said fluid after it passes over said cylindrical rotor surface, and (2) rotating said shaft to pump said fluid from said inlet through said disc pump, thereby causing said fluid to fan out 360 degrees in said distribution space and then into said cavitation zone, and to cause cavitation in said fluid in said cavities on said rotor by repeated expulsion of said fluid in said cavities by centrifugal force which generates pockets of low pressure immediately filled by said fluid.

2. Method of claim 1 wherein said housing is immersed in said fluid to be mixed.

3. Method of claim 1 wherein said fluid comprises ingredients of an oil field drilling fluid.

4. Method of claim 1 wherein said fluid comprises ingredients of an oil field fracturing fluid.

5. Method of claim 1 wherein said fluid comprises ingredients of an oil field completion fluid.

6. Method of claim 1 wherein said fluid comprises ingredients selected from aqueous fluids, nonaqueous fluids, and gases.

7. Method of claim 1 wherein said fluid includes suspended solids.

8. Method of claim 1 preceded by the step of partially filling said housing with said fluid.

\* \* \* \* \*